UNITED STATES PATENT OFFICE.

NATHANIEL T. BACON, OF PEACE DALE, RHODE ISLAND, ASSIGNOR TO THE SOLVAY PROCESS COMPANY, OF SOLVAY, NEW YORK, A CORPORATION OF NEW YORK.

ART OF RECOVERING SALTS OF POTASSIUM FROM SOLUTIONS THEREOF.

1,304,931.  Specification of Letters Patent.  Patented May 27, 1919.

No Drawing.  Application filed October 29, 1917. Serial No. 198,933.

*To all whom it may concern:*

Be it known that I, NATHANIEL T. BACON, a citizen of the United States, residing at Peace Dale, in the county of Washington and State of Rhode Island, have invented certain new and useful Improvements in the Art of Recovering Salts of Potassium from Solutions Thereof, of which the following is a specification.

My invention relates to the recovery of potassium salts from natural deposits thereof in solution in alkaline lakes or equivalent solutions formed by dissolving natural solid deposits of mixed salts in water, and the object of my improvements is to utilize solar heat in obtaining a greater degree of concentration in potassium salts than has heretofore been obtained thereby, thus effecting a considerable economy in the ultimate separation and recovery of these salts.

In many cases the mixture from which valuable elements are to be separated is very complicated and frequently contains constituents which would be of value individually if they could be obtained separately, whereas they are of no value when mixed together.

In carrying my invention into effect the solution to be treated may be and preferably is concentrated so far as practicable by evaporation by solar heat in the usual manner. That is, the solution is run or pumped in the first instance into a large reservoir where it is allowed to concentrate by evaporation to such an extent that the preliminary solid precipitate, as, for instance, NaCl, can be recovered in a state of marketable purity. The solution may then be run into a second similar tank or reservoir and allowed to concentrate further to the point where the proportion of the potassium content of the precipitate does not exceed the proportion of potassium salts to the total salt content of the liquor originally fed into this tank.

The liquor is then drawn off into a tank, having preferably a bottom of a color absorptive of radiant heat, as black, in such quantity that the bottom is covered with a layer of only such depth that the daily evaporation will effect a concentration in potassium salts of the desired degree, *i. e.*, approximate saturation therewith at the highest temperature attained.

I have found that with a layer of liquor about 1.5 inches in depth, in a container having a black bottom, the temperature of the liquor was, under favorable circumstances, by the action of solar radiation alone, raised to a temperature of 15° F. above that of the neighboring air. I have also found by experiment that the solubility of potassium salts in a solution carrying sodium salts increases rapidly until a temperature of about 120° F. is attained after which the increase is less rapid. Thus I am able by the action of radiant solar heat alone to keep the potassium salts in solution to a relatively high degree of concentration while at the same time the sodium salts are being precipitated out, whereas at a lower temperature the potassium salts would separate out in about the same proportion as the sodium salts.

It is evident that the temperature attained by the liquor and hence the degree of concentration in the potassium salts will vary with variations in atmospheric conditions, as of sun, wind, etc., and the depth of the layer of solution employed can evidently be varied accordingly. In any case, however, the concentration with potassium salts effected will be notably greater than has heretofore been accomplished by solar evaporation.

When the maximum heat of the day has passed and a point has been reached where the temperature of the liquor is about to begin to decline, the liquor is drawn off, as into a storage reservoir, wherein cooling with consequent precipitation of potassium salts may be prevented by artificial means. Further concentration with the potassium salts and their ultimate separation and recovery can then be effected in any usual or convenient manner, processes directed to which are well known. Or advantage may be taken of the decreasing solubility of potassium salts with decreasing temperature to separate potassium salts from the solution by loss of heat, leaving the mother liquor in a condition in which on the following day it can again be concentrated in the sun either alone or mixed with fresh liquor from the preliminary concentration.

After the liquor has been drawn off the precipitated salts are removed in any convenient way, as by being washed out so as to restore the heat absorbing color, and the tank is then ready for the next day's run. By means of my invention I obtain a notable economy in the recovery of potassium salts since it effects a relatively high degree of concentration by means of radiant solar heat alone without the expenditure of artificial fuel, the desirability of which will be well understood by those skilled in the art.

What I claim as new and desire to secure by Letter Patent is:

1. The improvement in the art of recovering potassium salts from solution which consists in exposing the solution to solar evaporation in a shallow mass of such depth that the solution will be approximately saturated with the potassium salts at the highest temperature attained during a single day's exposure.

2. The improvement in the art of recovering potassium salts from solution which consists in exposing the solution to solar evaporation in a shallow mass of such depth that the solution will be approximately saturated with the potassium salts at the highest temperature attained during a single day's exposure, with precipitation of sodium salts and drawing off the solution from the precipitated sodium salts before precipitation of potassium salts begins.

In testimony whereof I have affixed my signature, this 9th day of October 1917.

NATHANIEL T. BACON.